US012635795B1

(12) United States Patent
Singleton, V et al.

(10) Patent No.: US 12,635,795 B1
(45) Date of Patent: May 26, 2026

(54) WEB CAMERA MOUNT

(71) Applicants: William Benjamin Singleton, V, Weatherford, TX (US); Moeedul Haq Siddiqui, Arlington, TX (US)

(72) Inventors: William Benjamin Singleton, V, Weatherford, TX (US); Moeedul Haq Siddiqui, Arlington, TX (US)

(*) Notice: Subject to any disclaimer, the term of this patent is extended or adjusted under 35 U.S.C. 154(b) by 29 days.

(21) Appl. No.: 18/763,312

(22) Filed: Jul. 3, 2024

(51) Int. Cl.
  *A47B 97/00* (2006.01)
  *F16M 13/02* (2006.01)
  *H04N 23/54* (2023.01)
(52) U.S. Cl.
  CPC ............. *A47B 97/00* (2013.01); *F16M 13/02* (2013.01); *H04N 23/54* (2023.01); *A47B 2097/005* (2013.01)

(58) Field of Classification Search
  CPC .................. H04N 23/54; G03B 17/561; A47B 2097/005; F16M 13/02
  See application file for complete search history.

(56) References Cited

U.S. PATENT DOCUMENTS 11,174,985 B1 * 11/2021 Koulopoulos ........ G06F 1/1607
2024/0118592 A1 * 4/2024 Liu ...................... F16M 13/022

* cited by examiner

*Primary Examiner* — Xi Wang
(74) *Attorney, Agent, or Firm* — Plager Schack LLP; Mark H. Plager; Kara K. Verryt

(57) ABSTRACT

A web camera mount configured to removably engage with a bottom portion of a frame on a monitor and to support a webcam may include a rear jaw assembly; a front jaw assembly adjustably engaged with the rear jaw assembly via a ratcheting assembly, wherein the front jaw assembly includes a tab extending from an inner surface thereof to engage with the bottom portion of the frame; and a mount plate operatively attached to and extending from the front jaw assembly, the mount plate sized to support the webcam thereon.

8 Claims, 4 Drawing Sheets

WEB CAMERA MOUNT

BACKGROUND

The embodiments described herein relate generally to accessories for communication devices and, more particularly, to a web camera mount for engagement with a bottom edge of a frame on a monitor, such as a television or computer monitor.

Placement of web cameras in conference rooms is always a challenge. To date, many use double sided tape to tape the web camera to the bottom of a television, as this tends to be the perfect height for conference room cameras. Unfortunately, there are no existing mounts designed to engage with the bottom portion of a monitor frame. Rather, existing mounts are designed to sit on top of the monitor, which is not ideal for most conference room setups, as placement of the camera on top of the monitor provides a high angle view of the people in the conference room. The mounts used on the top of the monitor are not capable of sufficiently mounting to the bottom of the monitor, as doing so would invert the camera angle, and the existing mounts would fail to keep the camera level; in other words, attempting to use the existing mounts on the bottom of a monitor would result in sagging or falling of the mount.

Therefore, what is needed is a universal mount designed to engage with the bottom of a monitor frame, such as a television frame, wherein the mount is configured to support a web camera.

SUMMARY

Some embodiments of the present disclosure include a web camera mount configured to removably engage with a bottom portion of a frame on a monitor and to support a webcam. The web camera mount may include a rear jaw assembly; a front jaw assembly adjustably engaged with the rear jaw assembly via a ratcheting assembly, wherein the front jaw assembly includes a tab extending from an inner surface thereof to engage with the bottom portion of the frame; and a mount plate operatively attached to and extending from the front jaw assembly, the mount plate sized to support the webcam thereon.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
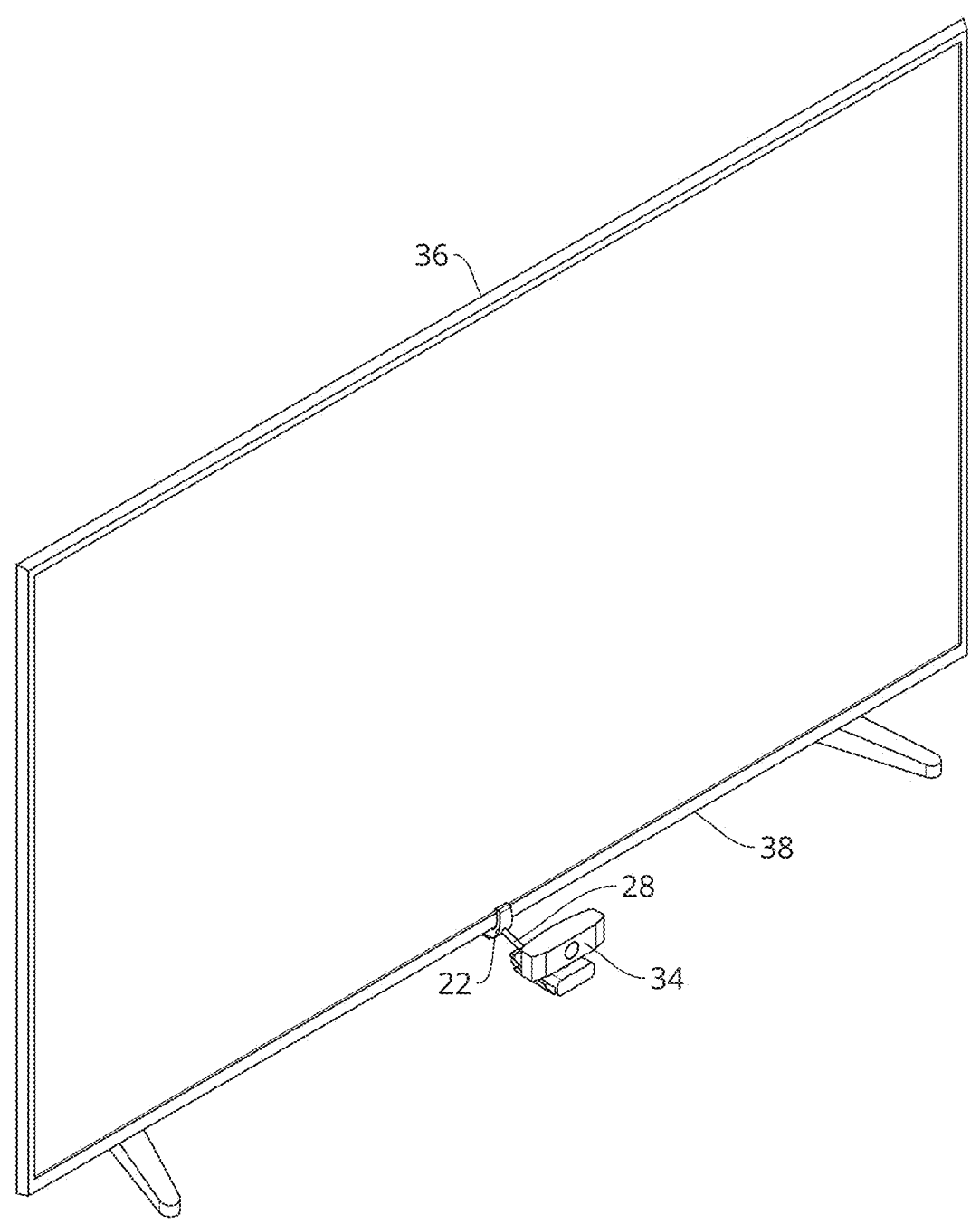
FIG. 1 is a perspective view of one embodiment of the present disclosure, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a web camera mount for mounting a web camera to the bottom of a monitor and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-7, some embodiments of the present disclosure include a web camera mount configured to removably engage with a bottom portion 38 of a frame on a monitor 36, such as a television or computer monitor, and to support a webcam 34, the mount comprising a rear jaw assembly 10; a front jaw assembly 20 adjustably engaged with the rear jaw assembly 10 via a ratcheting assembly; and a mount plate 30 operatively attached to and extending from the front jaw assembly 20.

More specifically, and as shown in the Figures, the rear jaw assembly 10 may comprise rear jaw body include a rear jaw tongue 14; a rear jaw hook 12 curving upward from a first end of the rear jaw tongue 14; and a rear jaw bottom arm extending outward from the rear jaw hook 12 such that the rear jaw bottom arm is spaced from and substantially parallel to the rear jaw tongue 14, wherein a plurality of rear jaw teeth 16 extend upward from a top surface of the rear jaw bottom arm toward the rear jaw tongue 14. In embodiments, a distal end of the rear jaw bottom arm may comprise a rear jaw release tab 18 extending downward therefrom. In use, the rear jar bottom arm may be flexibly, yet rigidly attached to the rear jar hook 12, such that when the rear jaw release tab 18 is pulled downward and away from the rear jaw tongue 14, the rear jaw teeth 16 move a greater distance away from the rear jaw tongue 14 and, when the rear jaw release tab 18 is released, the rear jaw teeth 16 move toward the rear jaw tongue 14.

As described above, a front jaw assembly 20 is adjustably engaged with or attached to the rear jaw assembly 10. More specifically, the front jaw assembly 20 may comprise a front jaw hook 20 having a planar portion and a curved portion extending in a curve upward from a distal end of the planar portion, wherein a distal end of the curved portion comprises a tab extending substantially perpendicularly from an interior surface thereof, such that, in use, the tab is configured to extend over the bottom portion 38 of the frame of the monitor 36 and back toward the monitor screen. The front jaw assembly 20 may further comprise a mount arm 28 extending outward from an outer surface of the curved portion of the front jaw hook 20 and a mount plate 30 extending outward from a distal end of the mount arm 28. As shown in the Figures, the mount arm 28 may extending at a downward angle from the front jaw hook 20 when the web camera mount is installed on a monitor 36. The mount plate 30 may be substantially planar and may extend at an angle from the distal end of the mount arm 28, such that the mount plate 30 is substantially parallel to a ground surface when the web camera mount is installed on a monitor 36. The mount plate 30 may have a mount plate orifice 32 extending therethrough, wherein the mount plate orifice 32 is sized to accommodate insertion of a standard camera mounting screw therein, such that a webcam 34 may be easily secured to an upper surface of the mount plate 30.

Figure 4:
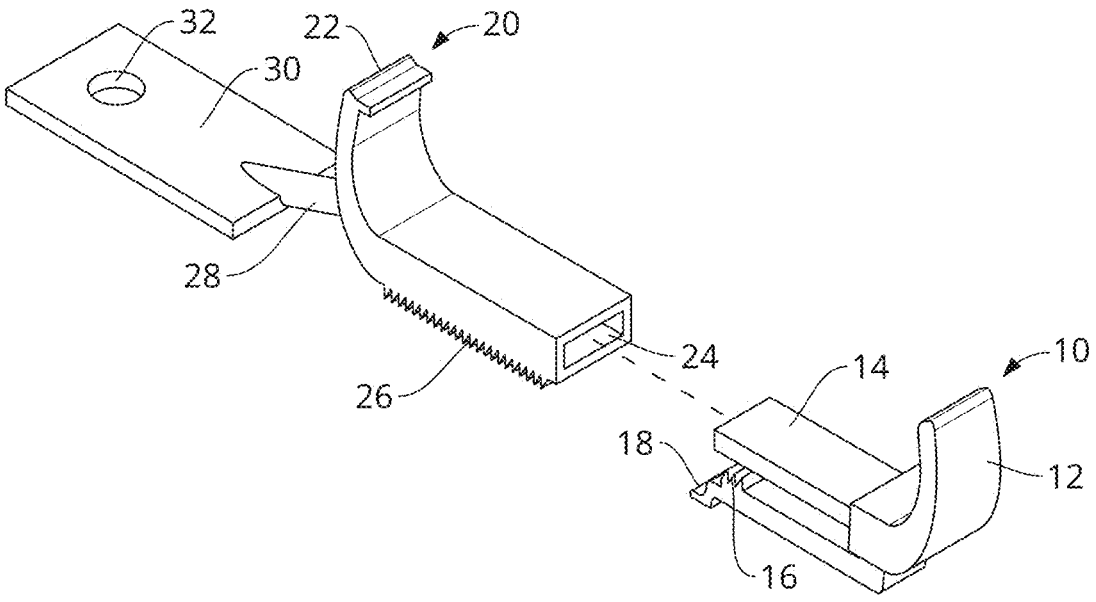
FIG. 4 is a rear perspective exploded view of one embodiment of the present disclosure.
Figure 5:
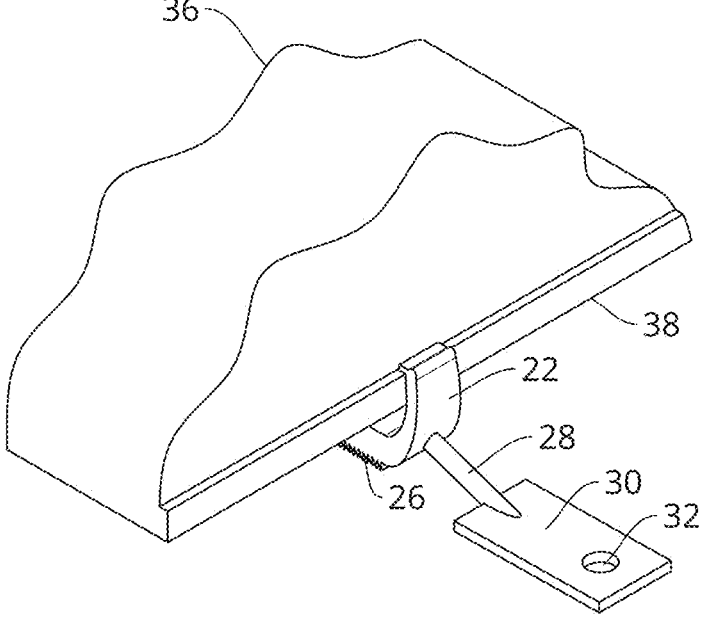
FIG. 5 is a perspective view of one embodiment of the present disclosure.

As shown most clearly in FIG. 4, the front jaw hook 22 may have a front jaw slot 24 extending into a proximal end thereof (i.e., the end of the front jaw hook 22 distal from the curved portion), wherein the front jaw slot 24 is sized to accommodate insertion of the rear jaw tongue 14 therein, allowing the front jaw assembly 20 to engage with the rear jaw assembly 10. As shown in the Figures, a bottom surface of the front jaw hook 22 may comprise a plurality of front jaw teeth 26 extending downward therefrom, wherein the front jaw teeth 26 are sized and positioned to engage with the rear jaw teeth 16 when the rear jaw tongue 14 is inserted into the front jaw slot 24, thus securely locking the rear jaw assembly 10 in place with respect to the front jaw assembly 20. In embodiments, the number of front jaw teeth 26 may be such that the entirety or almost the entirety of the bottom surface of the planar portion of the front jaw hook 22, allowing for an adjustable engagement of the rear jaw assembly 10 with respect to the front jaw assembly 20.

The web camera mount of the present disclosure may be made from any desired materials, such as a rigid material like plastic or metal, and using any conventional manufacturing processes.

Figure 2:
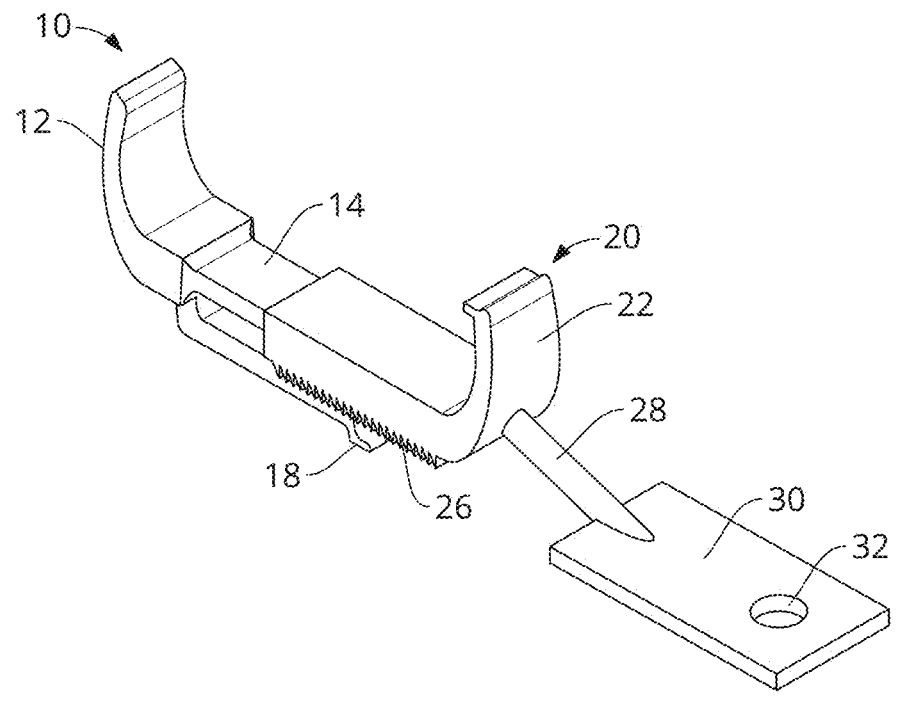
FIG. 2 is a perspective view of one embodiment of the present disclosure.
Figure 3:
FIG. 3 is a front perspective exploded view of one embodiment of the present disclosure.
Figure 3:
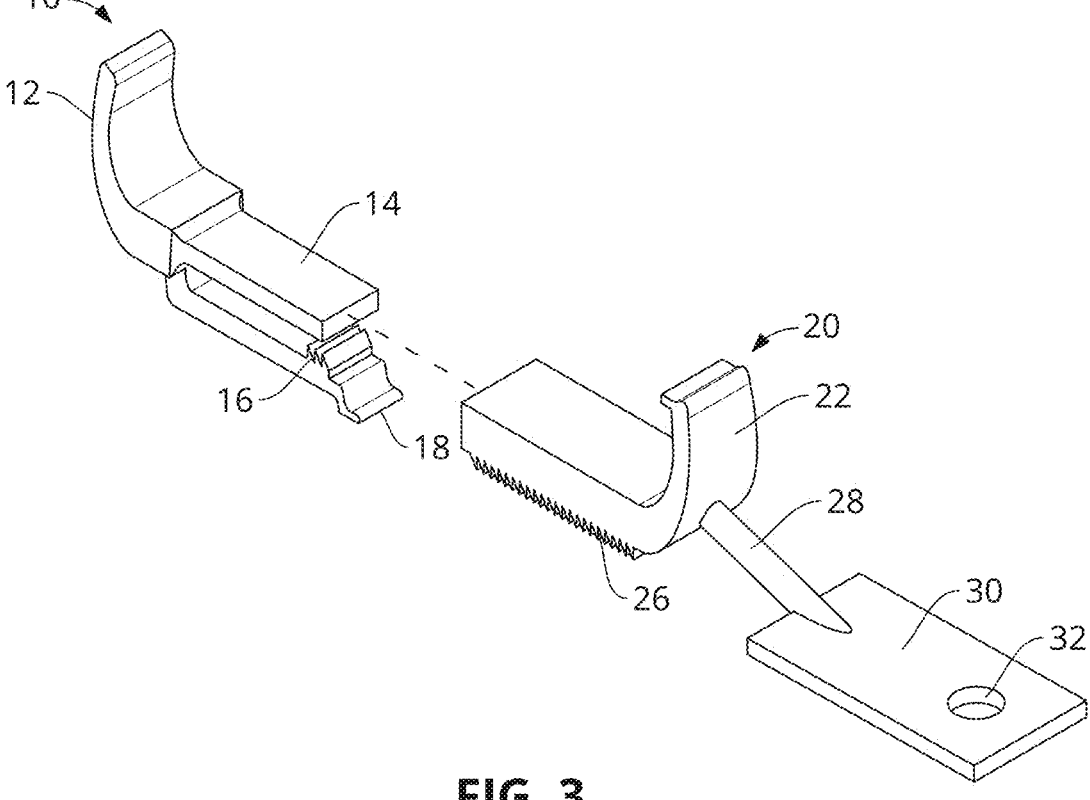
Figure 6:
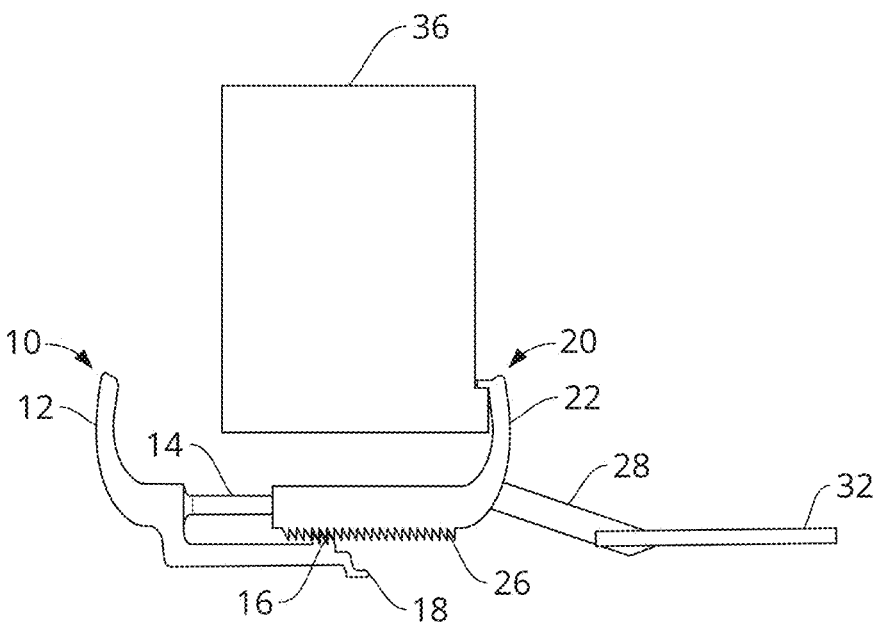
FIG. 6 is a side view of one embodiment of the present disclosure, shown being installed.
Figure 7:
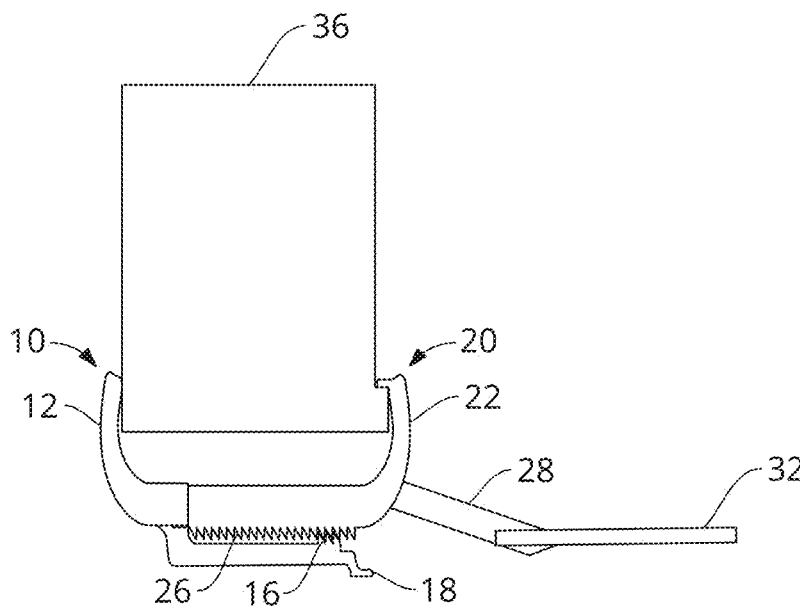
FIG. 7 is a side view of one embodiment of the present disclosure, shown installed.

To use the web camera mount of the present disclosure, the rear jaw tongue 14 may be inserted into the front jaw slot 24, causing the rear jaw teeth 16 to engage with the front jaw teeth 26, as shown in FIG. 2. The web camera mount may then be placed proximate to the bottom of a monitor 36, ensuring that the tab on the front jaw hook 22 is engaged with a bottom portion 38 of the frame of the monitor 36, as shown in FIG. 6. The rear jaw assembly 10 may then be closed against the rear of the monitor 36, securing the web camera mount to the bottom portion 38 of the monitor 36, as shown in FIG. 7. A webcam 34 may then be placed on the upper surface of the mount plate 30. A conventional camera mounting screw may be inserted through the mount plate 30 and engaged with a nut or other conventional securing device to secure the webcam 34 to the mount plate 30, as shown in FIG. 1. Because of the tab on the front jaw hook 22 and because of the angle of the mount arm 28, the webcam 34 may be held level and substantially parallel to the ground.

While the device of the present disclosure is described as being engaged with a bottom portion 38 of the frame of a monitor 36 during use, the device may be flipped or rotated to be engaged with the top or a side of the monitor 36, as desired.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A web camera mount configured to removably engage with a bottom portion of a frame on a monitor and to support a webcam, the mount comprising:
   a rear jaw assembly, the rear jaw assembly comprising:
      a rear jaw body comprising:
      a rear jaw tongue;
      a rear jaw hook curving upward from a first end of the rear jaw tongue;
      a rear jaw bottom arm extending outward from the rear jaw hook such that the rear jaw bottom arm is spaced from and substantially parallel to the rear jaw tongue; and
      a plurality of rear jaw teeth extending upward from a top surface of the rear jaw bottom arm toward the rear jaw tongue;
   a front jaw assembly adjustably engaged with the rear jaw assembly via a ratcheting assembly, wherein the front jaw assembly comprises a tab extending from an inner surface thereof to engage with the bottom portion of the frame; and
   a mount plate operatively attached to and extending from the front jaw assembly, the mount plate sized to support the webcam thereon.

2. The web camera mount of claim 1, further comprising a rear jaw release tab extending downward from a distal end of the rear jaw bottom arm.

3. The web camera mount of claim 1, wherein the front jaw assembly comprises:
   a front jaw hook having a planar portion and a curved portion extending in a curve upward from a distal end of the planar portion; and
   the tab extends substantially perpendicularly from the inner surface of a distal end of the curved portion.

4. The web camera mount of claim 3, wherein:
   the front jaw assembly further comprises a mount arm extending outward from an outer surface of the curved portion of the front jaw hook; and
   the mount plate extends outward from a distal end of the mount arm.

5. The web camera mount of claim 4, wherein:
   the mount arm extends at a downward angle from the front jaw hook;
   the mount plate is substantially planar and extends an angle from the distal end of the mount arm, such that the mount plate is substantially parallel to a ground surface when the web camera mount is installed on the monitor.

6. The web camera mount of claim 5, wherein the mount plate has a mount plate orifice extending therethrough, the mount plate orifice being sized to accommodate insertion of a standard camera mounting screw therein.

7. The web camera mount of claim 3, further comprising a front jaw slot extending into a proximal end of the planar portion of the front jaw hook, wherein the front jaw slot is sized to accommodate insertion of the rear jaw tongue therein.

8. The web camera mount of claim 7, wherein a bottom surface of the front jaw hook comprises a plurality of front jaw teeth extending downward therefrom, the front jaw teeth being sized and positioned to engage with the rear jaw teeth when the rear jaw tongue is inserted into the front jaw slot.

* * * * *